US008565444B2

(12) United States Patent
Johnson

(10) Patent No.: US 8,565,444 B2
(45) Date of Patent: Oct. 22, 2013

(54) DETECTING STEREO AND MONO HEADSET DEVICES

(75) Inventor: Timothy Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1237 days.

(21) Appl. No.: 12/190,848

(22) Filed: Aug. 13, 2008

(65) Prior Publication Data

US 2009/0175456 A1 Jul. 9, 2009

Related U.S. Application Data

(60) Provisional application No. 61/010,030, filed on Jan. 3, 2008.

(51) Int. Cl.
*H04R 1/10* (2006.01)
*G06F 3/00* (2006.01)

(52) U.S. Cl.
USPC .................. 381/74; 381/11; 381/12; 381/26; 710/15

(58) Field of Classification Search
USPC ............................................... 381/11, 12, 26
See application file for complete search history.

(56) References Cited

U.S. PATENT DOCUMENTS

| | | | | |
|---|---|---|---|---|
| 7,502,478 | B2 * | 3/2009 | King | 381/55 |
| 2002/0177474 | A1 * | 11/2002 | Oliveira | 455/574 |
| 2007/0049103 | A1 * | 3/2007 | Kashi et al. | 439/396 |

* cited by examiner

*Primary Examiner* — S. V. Clark
*Assistant Examiner* — Jesse Y Miyoshi
(74) *Attorney, Agent, or Firm* — Blakely, Sokoloff, Taylor & Zafman LLP

(57) ABSTRACT

The present invention includes apparatuses and methods comprising a means for detecting the presence of speakers and microphones coupled to a portable multi-function device (such as Apple's iPhone™). In response, a portable multi-function device can adapt its output depending on the nature of the coupled headset device. In particular, a portable multi-function device containing the present invention can, upon detecting only one speaker in a coupled headset accessory device, combine the multiple channels of a stereo audio signal into a single mono audio signal. Likewise, a portable multi-function device containing the present invention can alert users to the absence of a coupled microphone.

20 Claims, 12 Drawing Sheets

800

DETECTING STEREO AND MONO HEADSET DEVICES

CROSS-REFERENCE TO RELATED APPLICATION

This claims the benefit of U.S. Provisional Application No. 61/010,030, filed Jan. 3, 2008, which is hereby incorporated by reference herein in its entirety.

BACKGROUND OF THE INVENTION

The present invention relates to distinguishing between stereo and mono audio devices (such as headset speakers). More particularly, this invention relates to controlling the output of portable multi-function devices based upon detected conditions.

The widespread popularity of mobile telephones and other portable multi-function devices (e.g., portable MP3 players, portable video players, media-capable mobile telephones) is largely due to their portability. These devices enable users to enjoy media and conduct telephone calls while on the go.

As portable multi-function devices have proliferated, so too have headsets. Headsets contain one or more speakers that can emit sound generated by a portable multi-function device. Headsets capable of emitting one channel of audio are sometimes referred to herein as "mono headsets." Headsets that can emit more than one channel of audio are sometimes referred to herein as "stereo headsets."

Some headsets also include one or more microphones and facilitate a conversation between two people. Headset microphones and their corresponding circuitry can convert sound, which may be produced by a user, to electrical signals which are sent to a portable multi-function device.

Stereo and mono headsets offer different advantages. For example, a stereo headset that includes two speakers is most desirable for listening to recorded media. This is because almost all commercial audio recordings divide audio among two or more stereo channels—a technique that provides a rich and pleasant listing experience. By contrast, telephone conversations only require one channel of audio, and, therefore, only require one speaker. In part, this is because telephones are primarily used for communication, rather than auditory enjoyment. Additionally, telephone users commonly engage in activities that require an awareness of one's surroundings (e.g., driving, bicycling while using a headset). For at least these reasons, some mobile telephone users prefer mono headsets.

However, a problem arises when, for example, a mono headset is used with a portable multi-function device outputting audio in stereo. Stereo audio includes two channels of sound, but mono headsets can emit only one channel of sound. A user listening to a stereo recording on a mono headset would have a severely diminished listening experience because some of the recording would not be heard.

Another problem arises when, due to defect, damage, or any other cause, one or more speakers in a headset do not operate properly. For example, a damaged or defective stereo headset may have only one operational speaker. Similarly, a damaged or defective stereo headset may have one speaker that operates properly, and another speaker that produces distorted or intermittent sound. A user listening to a stereo recording on a defective or damaged headset would have a severely diminished listening experience because distorted or intermittent sound would be produced.

Another problem arises when a headset that does not contain a microphone is used for applications requiring a microphone (e.g., telephone calls). For example, a headset lacking a microphone coupled to a mobile telephone or a portable multi-function device having mobile telephony capability cannot properly carry a telephone call because it cannot receive a user's voice. (Portable multi-function devices having mobile telephony capability, such as Apple Inc.'s iPhone™, which can be used to perform various functions, including those related to communications and entertainment, may also be referred to herein as hybrid devices. iPhone™ is a trademark owned by Apple Inc.) Because portable multi-function devices cannot automatically detect the presence or absence of a headset microphone, users are not alerted when a microphone is not present.

Yet another problem arises when, due to defect, damage, or any other cause, a headset microphone does not operate properly. For example, a damaged or defective headset microphone may fail to convey audio signals, or may convey distorted or intermittent audio signals. The user in such cases may be unaware of the malfunction.

Another problem arises in detecting and responding to a headset being connected or disconnected from a portable multi-function device. For example, some portable multi-function devices, like Apple Inc's iPod™, pause the playback of media signals when headsets are removed. (iPod™ is a trademark owned by Apple Inc.) Such portable multi-function devices utilize a mechanical switch to detect insertion or removal of a headset tip. The mechanical switch is toggled physically by the insertion or removal of the headset tip, regardless of whether a functional headset is coupled to the portable multi-function device's connector. For example, among other things, nonfunctioning headsets or even a loose wire with a headset tip would toggle the switch.

SUMMARY OF THE INVENTION

The present invention, in various embodiments, addresses the above problems and others by providing systems, means, methods, and computer readable media that can be used to detect and respond to the presence and/or functional capabilities of a headset coupled to a portable multi-function device. The functional capabilities may be associated with physical components, circuitry, speakers, and microphones. Responses may include combining multiple stereo channels into a mono channel, or generating alerts.

In various configurations, the invention employs one or more headset channel detection sensors in a portable multi-function device. A headset channel detection sensor may include a circuit of connected electrical components (e.g., resistors, capacitors, transistors) which responds to changes in current caused by the introduction of a functional speaker or microphone to a portable multi-function device.

In one configuration, the detection circuit is triggered upon the insertion of a headset plug, or when an audio signal is initiated. Portable multi-function devices such as the iPhone™ presently generate such triggers. (Apple Inc. owns the iPhone™ trademark.) Upon being triggered, the headset channel detection circuit operates for a brief period of time, sensing the presence of speakers and microphones. In another configuration, the headset channel detection sensor operates continuously and does not use a trigger.

In some embodiments, a headset channel detection sensor is connected to each audio channel output on a portable multi-function device. When an operational stereo headset is present, the headset channel detection sensor for each stereo channel signals the portable multi-function device. In response, said device generates stereo audio data for each channel. Alternatively, when a headset with only one operational speaker (e.g., a mono headset or damaged stereo headset) is connected, only one headset channel detection sensor signal is sent to the portable multi-function device. In response, the portable multi-function device combines multiple stereo channels into a new mono channel, which is sent to the operational output audio channel.

In some embodiments, a headset channel detection sensor is connected to the headset microphone channel of a portable multi-function device. When an operational headset microphone is introduced, the headset channel detection sensor for that channel signals the portable multi-function device. Conversely, when an operational headset microphone is either absent or damaged, the headset channel detection sensor for that channel does not signal the portable multi-function device. If said device is then used for tasks that may require a headset microphone (e.g., telephone calls, or recording, monitoring and/or processing of sound), a warning is sent to the user. This warning may include audio, visual, or kinetic (e.g., vibrational) feedback.

In certain embodiments, one or more headset channel detection sensors aid in detection of headset insertion and removal. When the tip of a headset jack (sometimes referred to herein as a "headset tip") is inserted into a portable multi-function device, headset channel detection sensors only signal if the headset jack is coupled to a functional headset. Thus, a portable multi-function device will not respond to the insertion or removal of a non-functioning or otherwise invalid accessory device.

SUMMARY OF THE FIGURES

The above and other features of the present invention, including its various advantages, will be more apparent upon consideration of the following detailed description, taken in conjunction with the accompanying drawings, in which like reference characters refer to like parts throughout, and in which.

DETAILED DESCRIPTION OF THE INVENTION

Although portable multi-function devices currently enable users to communicate and be entertained, portable multi-function devices currently do not intelligently determine the input or output capabilities of coupled headsets. For example, as discussed earlier, portable multi-function devices currently do not distinguish between stereo or mono headsets. Similarly, portable multi-function devices currently do not detect whether coupled microphones or headset speakers are inoperative due to damage or defect.

The present invention, among other things, adds intelligence to the physical connection between portable multi-function devices and headsets. For example, the present invention can permit a portable multi-function device to automatically distinguish between mono and stereo headsets, based upon the headsets' enabled functionality. A portable multi-function device in accordance with the present invention may, for example, combine multiple stereo audio channels into a single mono audio channel when a headset with only one operable speaker is coupled to the portable multi-function device. The present invention can also enable a portable multi-function device to detect and alert users to a missing, defective, or damaged headset microphone.

Figure 1:
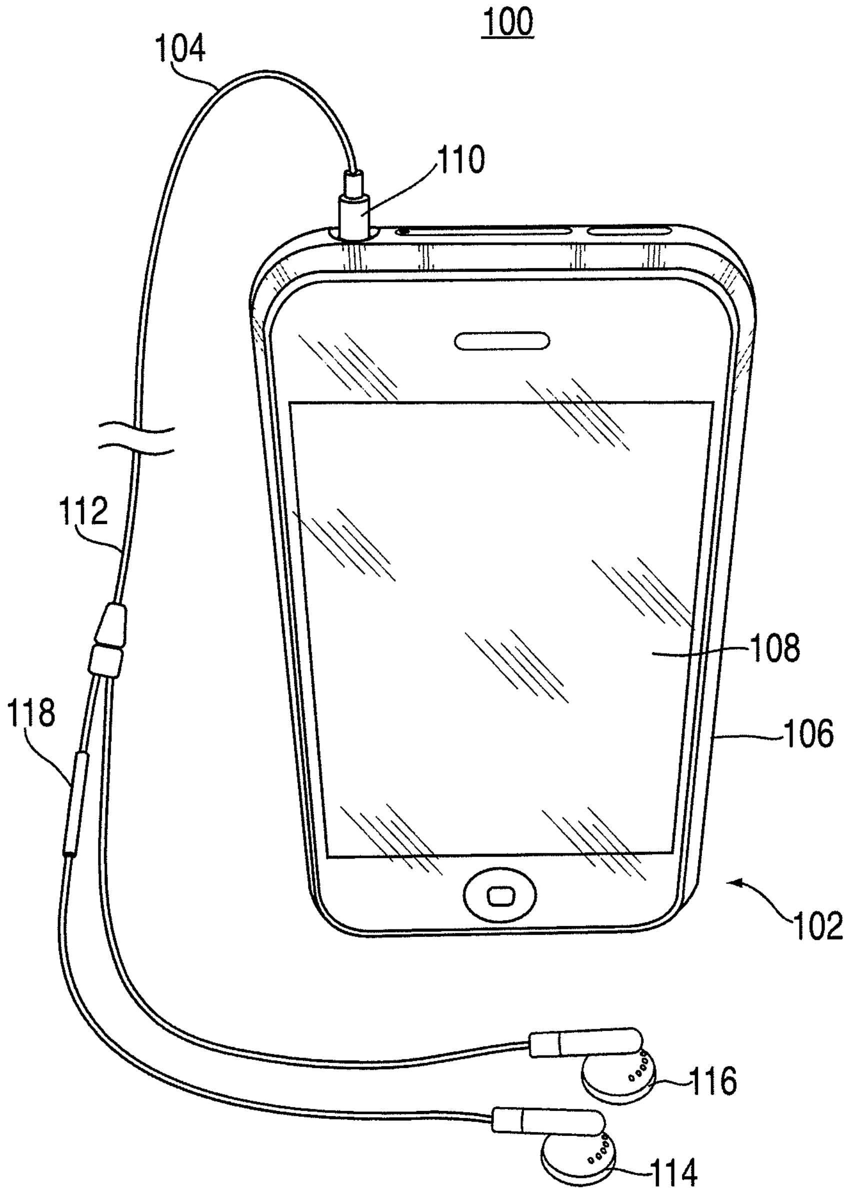
FIG. 1 is an illustrative portable multi-function device in accordance with one embodiment of the present invention.

FIG. 1 shows system 100. System 100 may include portable multi-function device 102 and accessory device 104. Portable multi-function device 102 may function as, among other things, a mobile telephone, satellite telephone, voice-over internet protocol ("VOIP") user device, personal digital assistant, pager, handheld computer, portable media player (e.g., MP3 player), remote controller, portable communications device, remote ordering interface, audio tour player, handheld internet device, or any other portable multi-function device capable of generating and/or processing audio data. Portable multi-function device 102 may be battery-powered and highly portable so as to allow a user to listen to music, play games or video, record audio, video, and/or photographs, communicate with others, and/or control other devices. Portable multi-function device 102 may also be used in conjunction with other devices or structures such as, for example, a vehicle, video game system, home appliance, article of clothing, helmet, eye glasses, wearable apparel, stereo system or other entertainment system, other portable device, etc.

In some embodiments, portable multi-function device 102 may be coupled to and/or synchronized with, for example, one or more remote computing systems, servers and/or other electronic device(s). Portable multi-function device 102 may also receive media files (using wireless and/or wired communications paths from one or more other devices). Media files can include, for example, video, audio, image, multi-media and/or any other types of digital data. The files may be formatted in any manner.

Portable multi-function device 102 may include housing 106, display 108, and connector 110. In some embodiments, housing 106 may include, for example, polymer-based materials, metals, etc. Housing 106 defines the form factor of portable multi-function device 102. In some embodiments, housing 106 encloses and/or supports components of portable multi-function device 102 such as, for example, display 108, connector 110, one or more circuit boards and circuitry, internal antennas, speakers, microphones, storage devices, processors, and/or other components. Further details regarding exemplary internal components are discussed below in connection with FIG. 3.

Portable multi-function device 102 may also include display 108. Display 108 may include any suitable display screen or projection system for displaying information and/or graphical user interfaces to the user. For example, display 108 may be an LCD screen. As another example, display 108 may include a projection system (e.g., a video projector) for providing a display of content on any surface remote from portable multi-function device 102.

Portable multi-function device 102 may be coupled to accessory device 104 via connector 110. Connector 110 may include any suitable port for transmitting, among other things, audio data. For example, connector 110 can be a female 3.5 mm stereo port (sometimes referred to as a TRS connector port). As another example, connector 110 may be a universal serial bus ("USB") port, a 30-pin connector port, any other type of port or any combination thereof. In some embodiments, more than one connector may be included in portable multi-function device 102.

Accessory device 104 may be, for example, a headset, headsets or any other device capable of producing sound based on audio data it receives. In some embodiments, such as when accessory device 104 is physically coupled to portable multi-function device 102, accessory device 104 may include cable 112. In other embodiments (not pictured), cable 112 can be a wireless communications path.

Cable 112 can facilitate the transfer of audio data from portable multi-function device 102 to accessory device 104. In one embodiment, accessory device 104 includes left speaker 114 and right speaker 116, which preferably correspond respectively to the left and right audio channels of stereo sound. Speakers 114 and 116 may include, among other things, an audio speaker, internal circuitry, and an acoustic assembly. Accessory device 104 may also include microphone 118, which can facilitate the generation of audio data from sound (e.g., the user's voice). Speaker 114, speaker 116, and microphone 118 are sometimes referred to herein as transducers. One skilled in the art would appreciate that microphone 118 may be omitted from accessory device 104.

Figure 2:
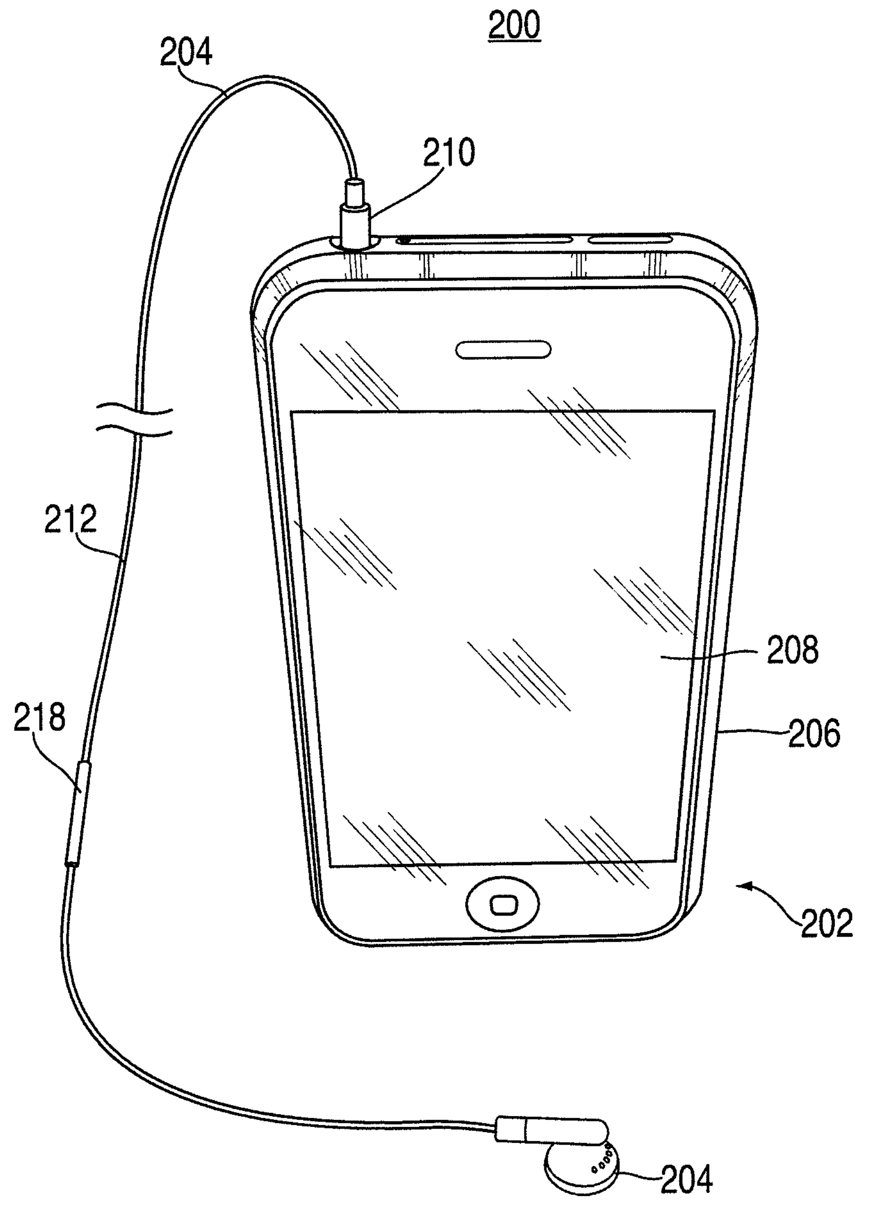
FIG. 2 is another illustrative portable multi-function device in accordance with another embodiment of the present invention.

FIG. 2 shows system 200, which may include portable multi-function device 202 coupled to mono headset accessory device 208. Portable multi-function device 202 and its components may be similar to or the same as portable multi-function device 102. Unlike stereo headset 104, mono headset 204 contains only one speaker (shown in FIG. 2 as speaker 206). Although microphone 208 is shown in FIG. 2 as being incorporated into headset 204, one skilled in the art would appreciate that a microphone may be omitted in various embodiments of accessory device 204.

Figure 3:
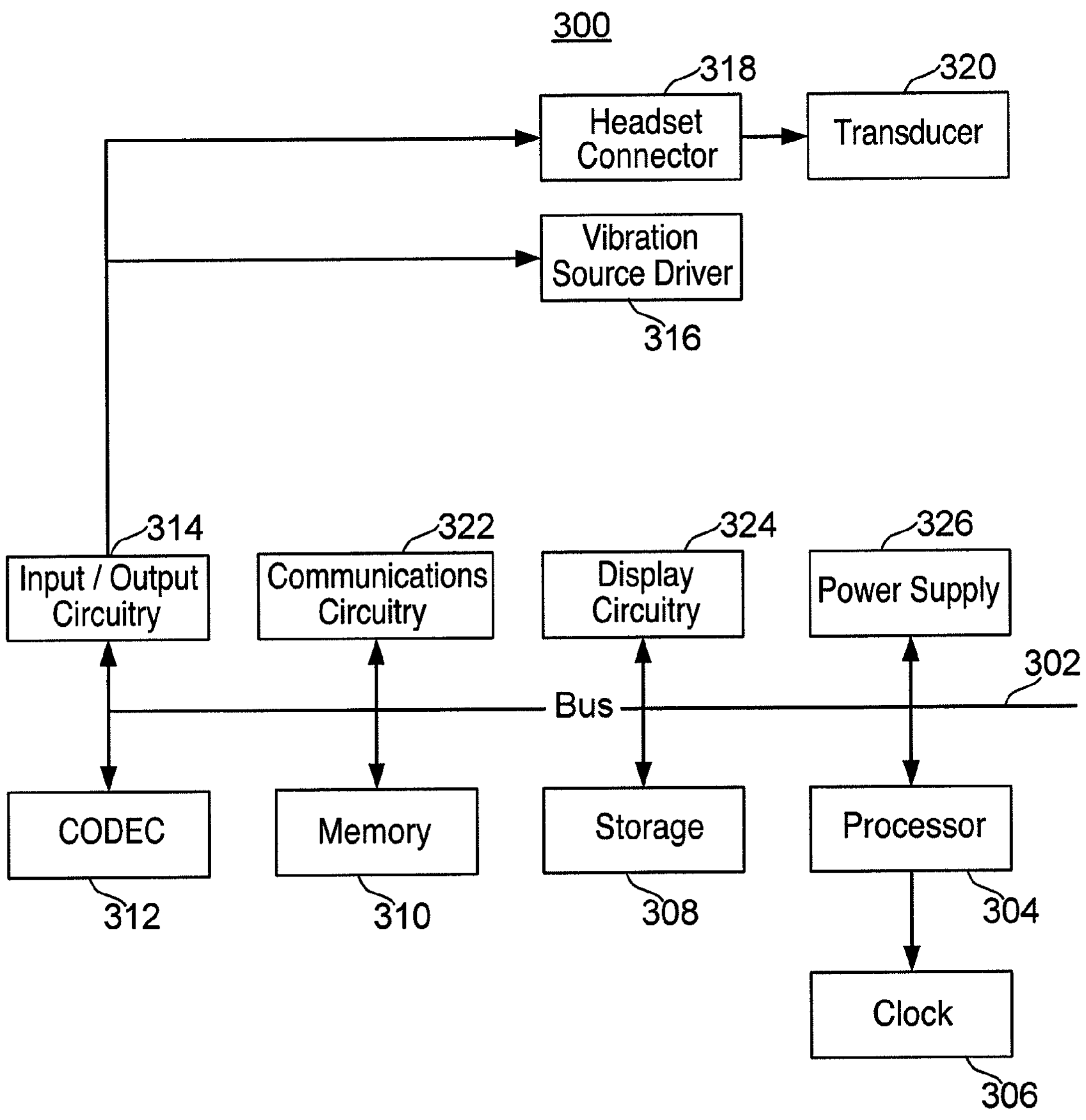
FIG. 3 is an illustrative block diagram of an portable multi-function device in accordance with one embodiment of the present invention.

FIG. 3 is an illustrative block diagram of components that can be included in portable multi-function device 300. Portable multi-function device 300 is an electronic device in accordance with embodiments of the present invention, and may be the same as or similar to portable multi-function devices 102 and/or 202.

Portable multi-function device 300 may include bus 302, processor 304, clock 306, storage 308, memory 314, vibration source driver 316, headset connector 318, transducer 320, communications circuitry 322, display circuitry 324, and power supply 326. One skilled in the art would appreciate that one or more of the components shown in FIG. 3 may be functionally combined, omitted and/or included in a device coupled to portable device 300. One skilled in the art would appreciate that each component included in FIG. 3 may represent a plurality of components.

Bus 302 may provide a data transfer path for transferring data to, from, or between any or all components of portable multi-function device 300. Bus 302 may be, for example, a conduit composed of one or more electrically conductive pathways (e.g., wires), one or more optical pathways, or any other medium capable of transferring data among the components of portable multi-function device 300. One skilled in the art would appreciate that bus 302 may transfer data in serial and/or parallel fashion. One skilled in the art would also appreciate that bus 302 may operate locally within portable multi-function device 300, or may extend to components external to portable multi-function device 300.

System 300 may also include processor 304. Processor 304 may control and/or coordinate the operation of many functions and other components included in portable multi-function device 300. Processor 304 may, for example, coordinate inputs received from I/O circuitry 314 and, in response, cause corresponding display(s) to be generated by display circuitry 324. Display circuitry 324 may, for example, facilitate the generation of images and text on the display of a portable multi-function device (e.g., display 108 of FIG. 1).

Clock 306 may be included within processor 304, and may be an oscillator, dedicated clock circuit and/or IC, a software-based clock or timer application. Clock 306 may be synchronized with a remote timing source such as a network clock, remote server clock, timing standard source.

Storage device 308 may store media files (e.g., music and video files), software (e.g., for implanting functions on portable multi-function device 300), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable portable multi-function device 300 to establish wireless communications with another device), subscription information (e.g., information related to podcasts, television shows or other media a user subscribes to and/or pays money to access), and any other suitable data. Storage device 308 may include one more storage mediums, including for example, a hard-drive, permanent memory such as ROM, semi-permanent memory such as RAM, or cache.

Memory 310 may include one or more different types of memory which may be used for performing device functions. For example, memory 310 may include cache, ROM, and/or RAM.

Coder/decoder (CODEC) 312 may be included to convert digital audio data into analog signals directed toward transducer 320 via headset connector 318 to produce sound, including voice, music, and other audio. CODEC 312 may also convert audio signal inputs from transducer 320 into digital audio data. Transducer 320 may, for example, facilitate the conversion of electrical energy to acoustic energy (e.g., sound) and/or the conversion of acoustic energy to electrical energy. Headset connector 318 may include any suitable port for transmitting or receiving, among other things, audio data.

I/O circuitry 314 may convert signals and/or data generated by user input into data for use by portable multi-function device 300. For example, I/O circuitry 308 may convert signals generated by a user's contact with a multi-touch display screen into data. (A multi-touch display screen, referred to herein, is a display screen capable of sensing, among other things, multiple regions of physical contact between a user and the screen's surface). I/O circuitry 314 may also convert data generated by portable multi-function device 300 into signals and/or data for use by various output devices. For example, I/O circuitry 308 may convert data generated by portable multi-function device 300 into signals that control vibration source driver 316.

Vibration source driver 316 may, for example, facilitate sending motion, vibration, and/or movement information related to an operation of the portable multi-function device. For example, vibration source driver 316 may enable a portable multi-function device to vibrate when a call is received by activating vibration-capable elements housed within a portable multi-function device.

Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocol standards may also be used, either in alternative to the identified protocols or in addition to the identified protocols. Other network standards may include Bluetooth, the Global System for Mobile Communications (GSM), and code division multiple access (CDMA) based wireless protocols. Communications circuitry 322 may also include circuitry that enables device 300 to be electrically coupled to another device (e.g., a computer or an accessory device) and communicate with that other device. Power supply 326 may be an electrical storage device (e.g., a battery) or any other device capable of providing a compact portable multi-function device with the energy needed to operate.

Figure 4:
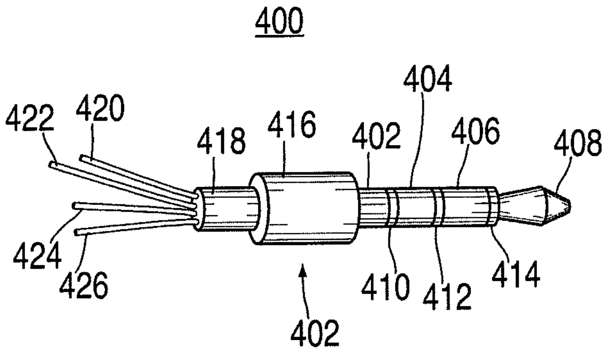
FIG. 4 is an illustrative headset tip, showing the tip profile for a stereo connection with microphone.

FIG. 4 shows stereo headset tip 400. Stereo headset tip 400 is the portion of, for example, accessory device 104 that couples to a headset connector (such as connector 110 of FIG. 1) of a portable multi-function device. In the embodiment shown, stereo headset tip 400 includes conductive regions 402, 404, 406 and 408, separated by non-conductive regions 410, 412, and 414. Conductive regions 402, 404, 406 and 408 are capable of conveying data (which may be, e.g., digital or analog audio data) from a portable multi-function device to transducers and vice-versa. Non-conductive regions 410, 412, and 414 do not convey data as electrical signals. In the exemplary embodiment shown in FIG. 4, conductive region 408 is shown as the terminus of stereo headset tip 400, which would be the first region to enter a headset connector of a portable multi-function device. In other embodiments, although conductive regions assigned to different audio channels may not contact one another, the sequence, layout, or relative locations of headset tip regions may vary. Further from the terminus is headset wire housing 416 and headset wire shroud 418. Headset wire shroud 418 can protect the encased wires from elements such as water or dirt.

FIG. 4 also shows a cross-sectional cut-away view of headset wire shroud 418, revealing left channel headset wire 420, right channel headset wire 422, microphone channel headset wire 424, and ground headset wire 426. As discussed further below in connection with, e.g., FIG. 6, wires 420, 422, 424 and 426 can couple speaker and microphone components of a headset to a portable multi-function device. One skilled in the art would appreciate that the microphone channel depicted in FIG. 4 may be omitted in other embodiments.

Wire 420, as shown in FIG. 4, passes through headset wire housing 416 and is electrically coupled to conductive region 408 (the terminus of headset tip 400). Wire 422, as shown in FIG. 4, passes through headset wire housing 416 and is electrically coupled to conductive region 406. Microphone channel wire 424 passes through headset wire housing 416 and is electrically coupled to conductive region 402. Similarly, ground wire 426 passes through headset wire housing 416 and is electrically coupled to conductive region 404. FIG. 4 depicts just one of many possible assignments of audio channels to conductive regions on a stereo headset tip. Similarly, FIG. 4 depicts just one of many possible embodiments of a stereo headset tip that may connect to a headset jack on a portable multi-function device. One skilled in the art would appreciate that, although the most common implementation is illustrated in FIG. 4, the present invention can be used with any type of physical connectors that facilitate the transfer of audio data.

When inserted into a device's connector component (like connector 110 of FIG. 1), conductive regions 402, 404, 406 and 408 may be physically and electrically coupled to corresponding internal conductive regions of the connector. These internal conductive regions help facilitate the transfer of, e.g., audio data to a headset's left and right speakers as well as audio data from a headset's microphone. Further, the connector's internal conductive regions provide electrical ground, which can help power a headset's speakers and microphone. This is discussed in greater detail below in connection with, e.g., FIGS. 8 and 9. In the exemplary embodiment shown in FIG. 4, non-conductive regions 410, 412, and 414 provide electrical separation between the conductive regions of the tip. These non-conductive regions allow a headset's speakers and microphone to carry distinct channels of audio data.

Figure 5:
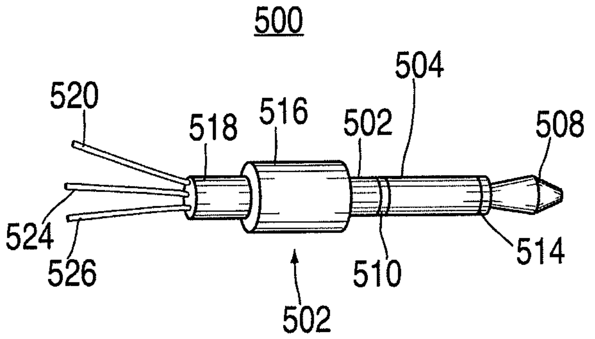
FIG. 5 is an illustrative headset tip, showing the tip profile for a mono connection with a microphone.

FIG. 5 shows mono headset tip 500. Mono headset tip 500 is the portion of, for example, accessory device 204 that couples a headset or other accessory device to a headset connector (such as connector 210 of FIG. 2) of a portable multi-function device. In the embodiment shown, mono headset tip 500 includes conductive regions 502, 504, and 508, separated by non-conductive regions 510, and 514. Conductive regions 502, 504, and 508 are capable of conveying audio data (which may be digital or analog) from a portable multi-function device to transducers and visa-versa. Non-conductive regions 510 and 514 may not convey audio data as electrical signals. In the exemplary embodiment shown in FIG. 5, conductive region 508 is shown as the terminus of stereo headset tip 500, which would be the first region to enter a connector of a portable multi-function device. In other embodiments, although conductive regions assigned to different audio channels may not contact one another, the sequence, layout, or relative locations of headset tip regions may vary. Further from the terminus is headset wire housing 516 and headset wire shroud 518. Headset wire shroud corresponds to, for example, headset wire 212 of FIG. 2 and protects encased wires from elements such as water or dirt.

FIG. 5 also shows a cross-sectional cut-away view of headset wire shroud 518, revealing mono channel headset wire 520, microphone channel wire 524, and ground wire 526. As discussed further below in connection with, e.g., FIG. 7, wires 520, 524 and 526 couple speaker and microphone elements in a headset to a portable multi-function device. One skilled in the art would appreciate that the microphone channel depicted in FIG. 5 may be omitted in other embodiments.

Wire 520, as shown in FIG. 5, passes through headset wire housing 516 and is electrically coupled to conductive region 508 (the terminus of headset tip 500). Microphone channel wire 524 passes through headset wire housing 516 and is electrically coupled to conductive region 502. Similarly, ground wire 526 passes through headset wire housing 516 and is electrically coupled to conductive region 504. FIG. 5 depicts just one of many possible assignments of audio channels to conductive regions on a mono headset tip. FIG. 5 depicts just one of many possible embodiments of a mono headset tip that may connect to a headset jack on a portable multi-function device. One skilled in the art would appreciate that, although the most common implementation is illustrated in FIG. 5, the present invention can be used with any type of physical connectors that facilitate the transfer of, e.g., audio data.

When inserted into a device's connector component (like connector 210 of FIG. 2), conductive regions 502, 506 and 508 may be physically and electrically coupled to corresponding internal conductive regions of the connector. These internal conductive regions help facilitate the transfer of, e.g., audio data to a headset's mono speaker as well as audio data from a headset's microphone. Further, the connector's internal conductive regions provide electrical ground, which can help power a headset's speakers and microphone. This is discussed in greater detail below in connection with, e.g., FIGS. 8 and 9. In the exemplary embodiment shown in FIG. 5, non-conductive regions 510 and 514 provide electrical separation between the conductive regions of the tip. These non-conductive regions allow a headset's speakers and microphone to carry distinct channels of audio data.

Figure 6:
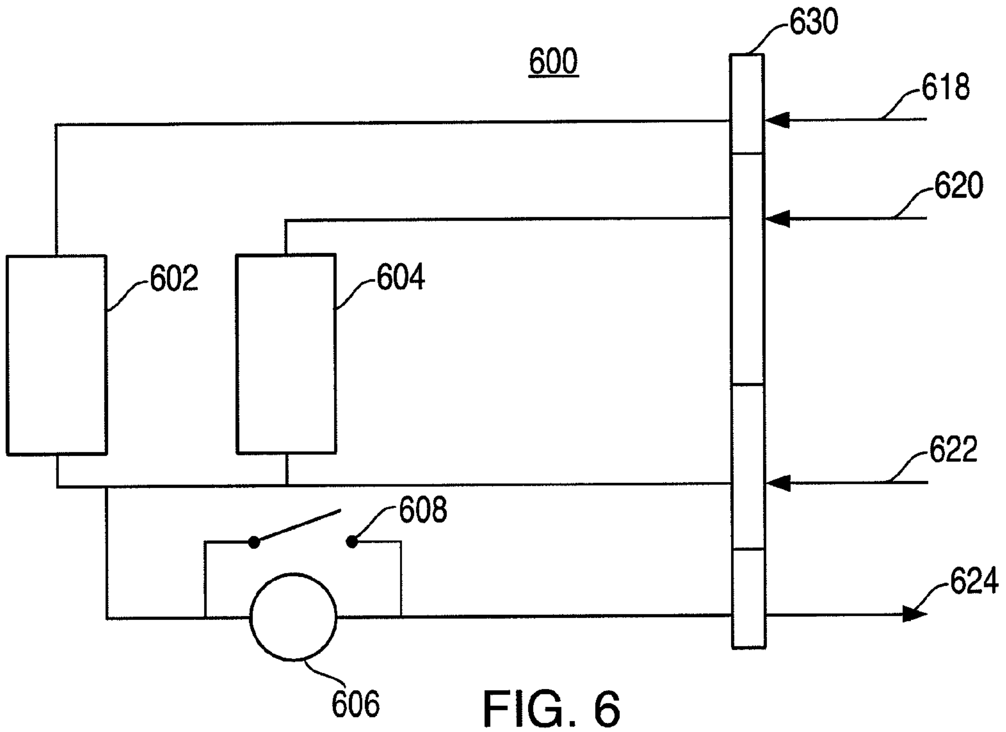
FIG. 6 is an illustrative schematic diagram of the connection between a headset jack and a stereo headset.

FIG. 6 is a simplified schematic diagram of exemplary electrical connections between the connector of a portable multi-function device (e.g., connector 110 of portable multi-function device 102) and a stereo headset's speakers and microphone (e.g., accessory device 104's speakers 114 and 116 and microphone 118). One skilled in the art would appreciate that headset microphone circuitry 606 shown in FIG. 6 may be omitted in other embodiments without departing from the spirit of the present invention.

Left channel headset wire 618 may facilitate the transfer of, e.g., audio data stored and/or generated by a portable multi-function device. Left channel headset wire 618 can facilitate the transfer of data to left headset speaker 602, which may be any type of transducer that can convert audio data to sound. Left headset speaker 602 may require a voltage differential to operate. In such embodiments, the required voltage may be the difference in electrical potential between left channel headset wire 618 and ground wire 622, which connects to left headset speaker 602.

Similarly, right channel headset wire 620 may carry audio data stored and/or generated by a portable multi-function device. Right channel headset wire 620 can facilitate the transfer of data to right headset speaker 604, which may be any type of transducer that converts audio data to sound. Right headset speaker 604 may require a voltage differential to operate. In such embodiments, the required voltage may be the difference in electrical potential between left channel headset wire 620 and ground wire 622, which connects to right headset speaker 604.

Microphone channel audio wire may carry data generated by headset microphone circuitry 606. Microphone circuitry 606 may require a voltage differential to operate. In such embodiments, the required voltage may be provided by a coupled portable multi-function device.

Headset microphone switch 608 may enable users to control the functionality of the portable multi-function device and/or accessory device(s). Headset microphone switch 608 can be, for example, electrically coupled to headset microphone circuitry 606, as shown in FIG. 6, and physically located in a manner convenient to the user. When toggled, headset microphone switch 608 can activate or deactivate headset microphone circuitry 606 and generate headset microphone PTT ("push to talk") signal on wire 628. Upon receiving the headset microphone PTT signal, the portable multi-function device may, for example, begin, end, or mute a telephone call, music, and/or perform any other function.

Figure 7:
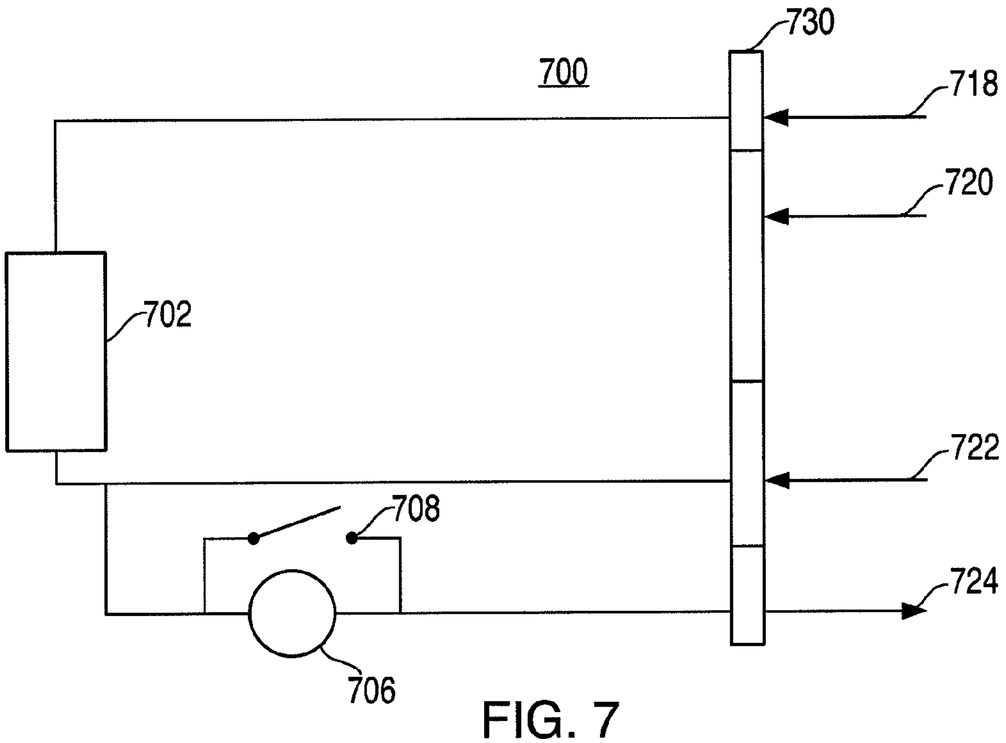
FIG. 7 is an illustrative schematic diagram of the connection between a headset jack and a mono headset.

FIG. 7 is a simplified schematic diagram of exemplary electrical connections between the connector of the portable multi-function device (e.g., connector 210 of portable multi-function device 202) and a mono headset's speaker and microphone (e.g., speaker 204 and microphone 218 of accessory device 204). System 700 and its components may be similar to or the same as system 600, with the exception that, unlike system 600, system 700 contains only one speaker (shown in FIG. 7 as speaker 702). One skilled in the art would appreciate that headset microphone circuitry 706 shown in FIG. 7 may be omitted in other embodiments without departing from the spirit of the present invention.

Figure 8:
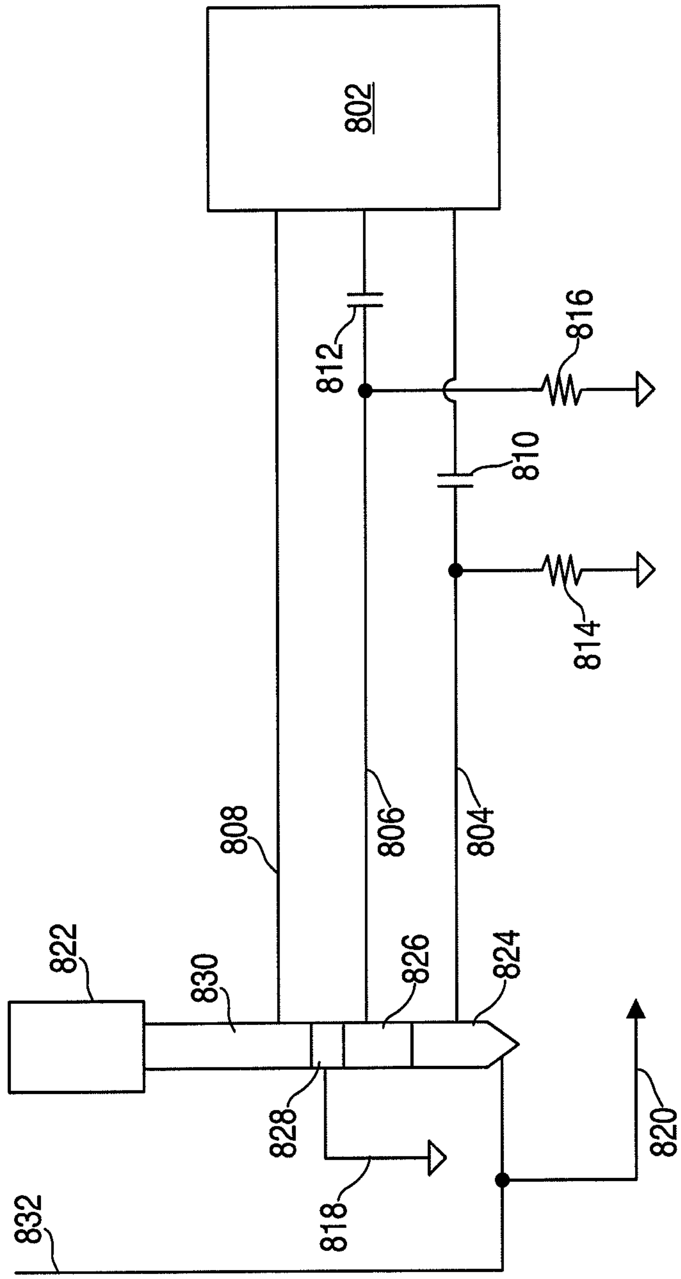
FIG. 8 is an illustrative schematic diagram of the internal electrical connections between a portable multi-function device and a stereo headset tip.

FIG. 8 is a simplified schematic diagram of system 800, which includes exemplary electrical connections between a portable multi-function device and a stereo headset tip (822). FIG. 8 includes audio CODEC 802, which may generate left channel audio data on wire 804 and right channel audio data on wire 806. Audio CODEC 802 may also receive microphone channel audio data on wire 808 if a headset microphone is present in a headset accessory device. In the exemplary embodiment shown, wire 804 may carry one channel of audio data to conductive region 824 of stereo headset tip 822. Similarly, wire 806 may carry one channel of audio data to conductive region 826 of stereo headset tip 822. Conductive region 830 of stereo headset tip 822 provides audio data 808 to audio CODEC 802. Finally, wire 818 may carry a ground signal directly to conductive region 828 of stereo headset tip 822. In other embodiments, the arrangement, sequence or relative locations of audio data paths and headset tip regions may vary.

In certain embodiments, left and right channel audio (carried respectively on wires 804 and 806 in preferred embodiments of the portable multi-function device) can be filtered by one or more filtering mechanisms before reaching stereo headset tip 822. Such filtering may block unwanted audio frequencies or other signals generated by audio CODEC 802. Filters may be placed, for example, between audio CODEC 802 and stereo headset pin 822. A left channel filter may include capacitor element 810 and resistor element 814. Similarly, a right channel filter may include capacitor element 812 and resistor element 816. One skilled in the art will appreciate that capacitor elements 810 and 812 can block DC signals. One skilled in the art will also appreciate that capacitor elements 810 and 812 may each be properly biased by a resistor, such as resistor elements 814 and 816, as depicted in FIG. 8. As such, signal filters may block unwanted audio frequencies or other signals from audio CODEC 802 while preserving wanted audio data.

Some embodiments of portable multi-function devices feature a headset tip detect signal which may indicate the physical presence of a headset tip in the connector of a portable multi-function device. A headset tip detect signal may be generated, for example, when a stereo headset tip is present in the connector of a portable multi-function device. In the exemplary embodiment shown in FIG. 8, a headset tip detect signal is generated on wire 820 when stereo headset tip 822 is present in the headset jack of a portable multi-function device. In the absence of headset tip 822, wire 820 may carry the signal carried by headset tip detect control wire 832. However, when headset tip 822 is present in the portable multi-function device, conductive region 824 interrupts the headset tip detect control signal carried upon wire 832, thus generating a headset tip detect signal on wire 820. Some embodiments of portable multi-function devices may respond to a headset tip detect signal by, for example, starting or stopping audio playback.

Figure 9:
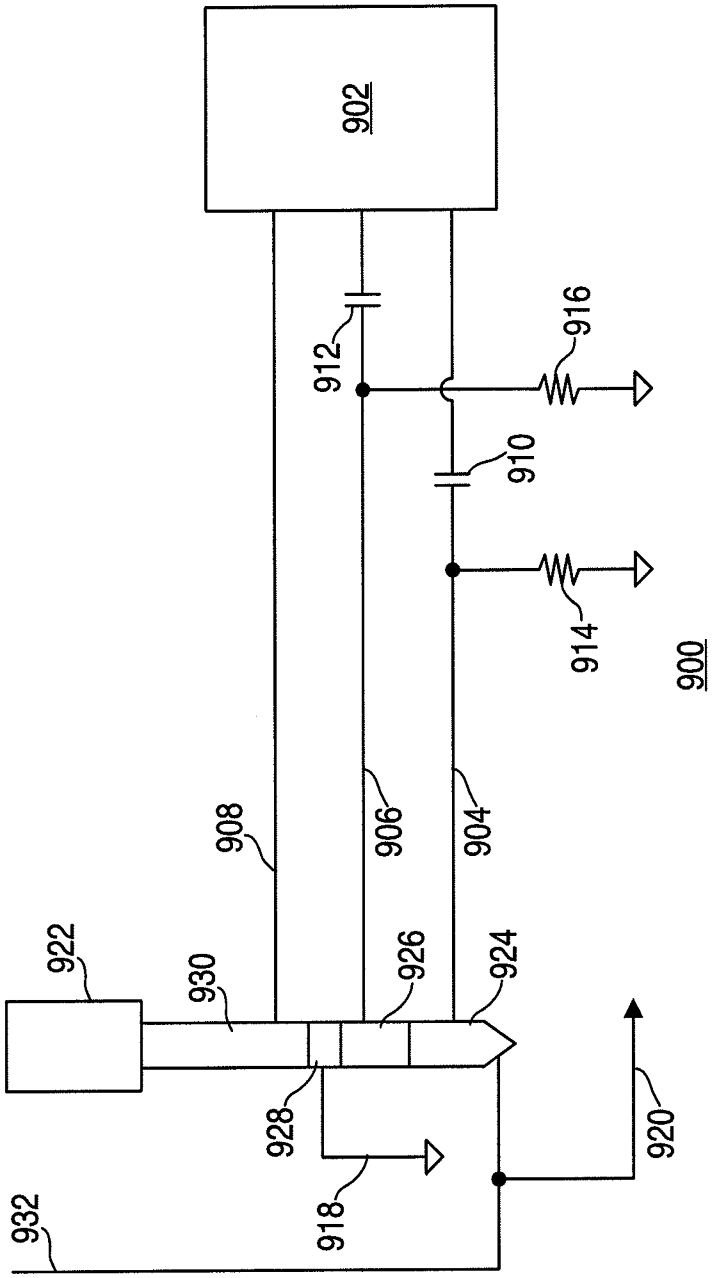
FIG. 9 is an illustrative schematic diagram of the internal electrical connections between a portable multi-function device and a mono headset tip.

FIG. 9 is a simplified schematic diagram of system 900, which includes exemplary electrical connections between a portable multi-function device and a mono headset tip (922). System 900 may be similar to or the same as system 800, with the exception that unlike system 800, system 900 contains a mono headset tip 922, which may drive a speaker in an accessory mono headset device. Wire 904 of system 900 may carry one channel of audio data to conductive region 924 of mono headset tip 922. However, because only one channel of audio data may be sent to mono headset tip 922, only one channel of sound may be generated by the speaker of a headset accessory device coupled to the portable media player. Thus, for example, if two channels of audio data were generated by the portable multi-function device, one channel of audio data would not be audible to a user.

Figure 10:
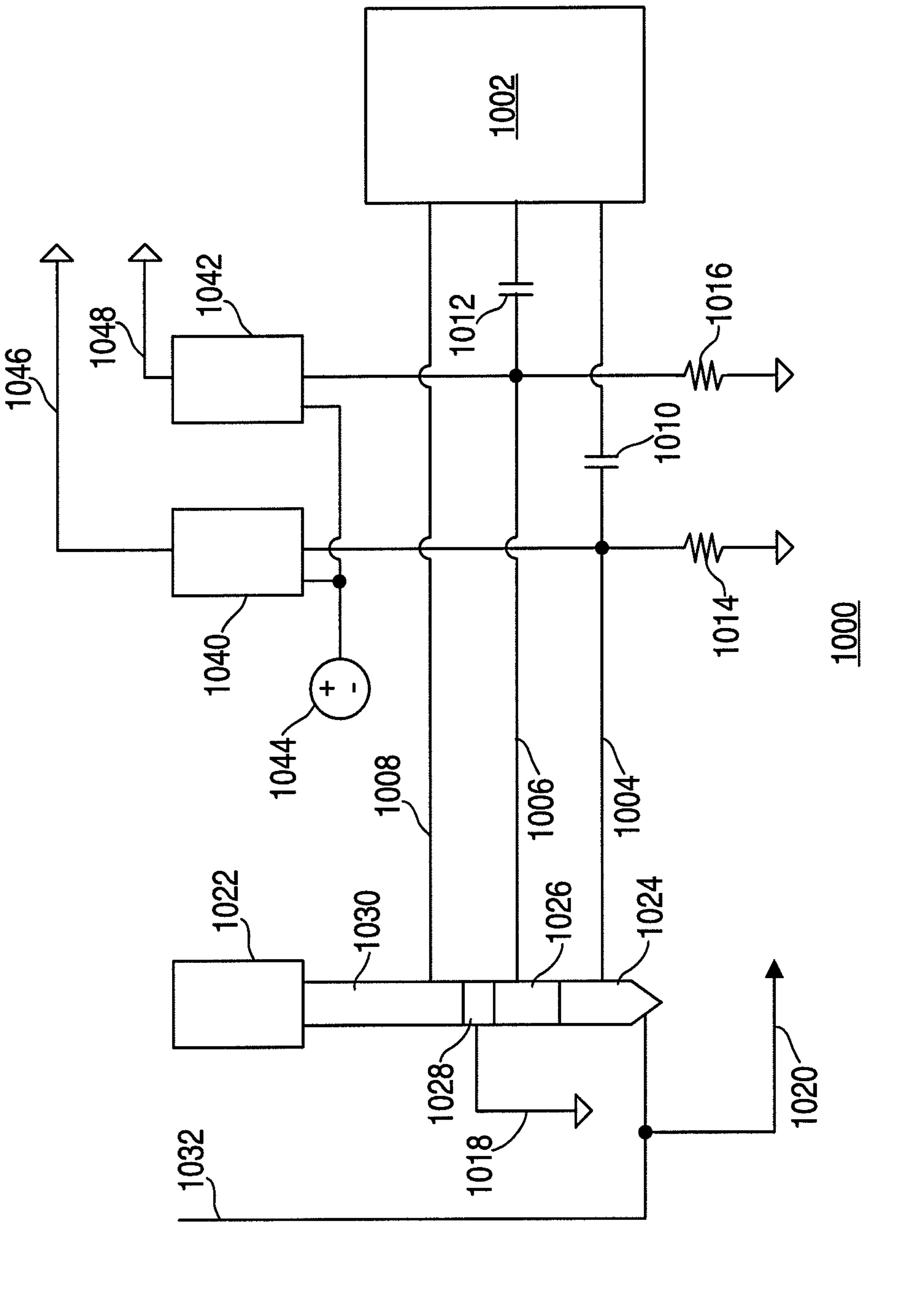
FIG. 10 is an illustrative schematic diagram of one embodiment of the invention operating within a portable multi-function device.

FIG. 10 is a simplified schematic diagram of system 1000, which includes exemplary electrical connections between a mono headset tip and a portable multi-function device incorporating elements of the present invention. System 1000 may be similar to or the same as system 800 and/or 900, with the exception that system 1000 may contain one or more detector blocks (shown in FIG. 10 as 1040 and 1042), which contain circuitry capable of responding to the electrical resistance created by a coupled headset device. Left channel detector block 1040 and right channel detector block 1042 (sometimes referred to herein as "detector blocks") may receive audio data 1004 and 1006, generated by CODEC 1002. Detector blocks 1040 and 1042 may also receive headset tip detect signal on wire 1020 (discussed above), and headset detect voltage on wire 1044 (a stable voltage source).

A headset tip detect signal is generated on wire 1020 in response to the presence of headset tip 1022 in the connector of a portable multi-function device (discussed earlier with respect to FIGS. 8 and 9). Detector blocks 1040 and 1042 may respond to this headset tip detect signal by monitoring the resistive loads on wires 1004 and 1006. Headset detector block 1042 may generate a headset detect signal on wire 1048 in response to a functional speaker being coupled to the left audio channel of headset tip 1022. Similarly, if a functional speaker is coupled to the right audio channel of headset tip 1022, headset detector block 1040 may generate a headset detect signal on wire 1046. The internal operation of one possible embodiment of a headset detector is detailed in FIG. 11.

Figure 11:
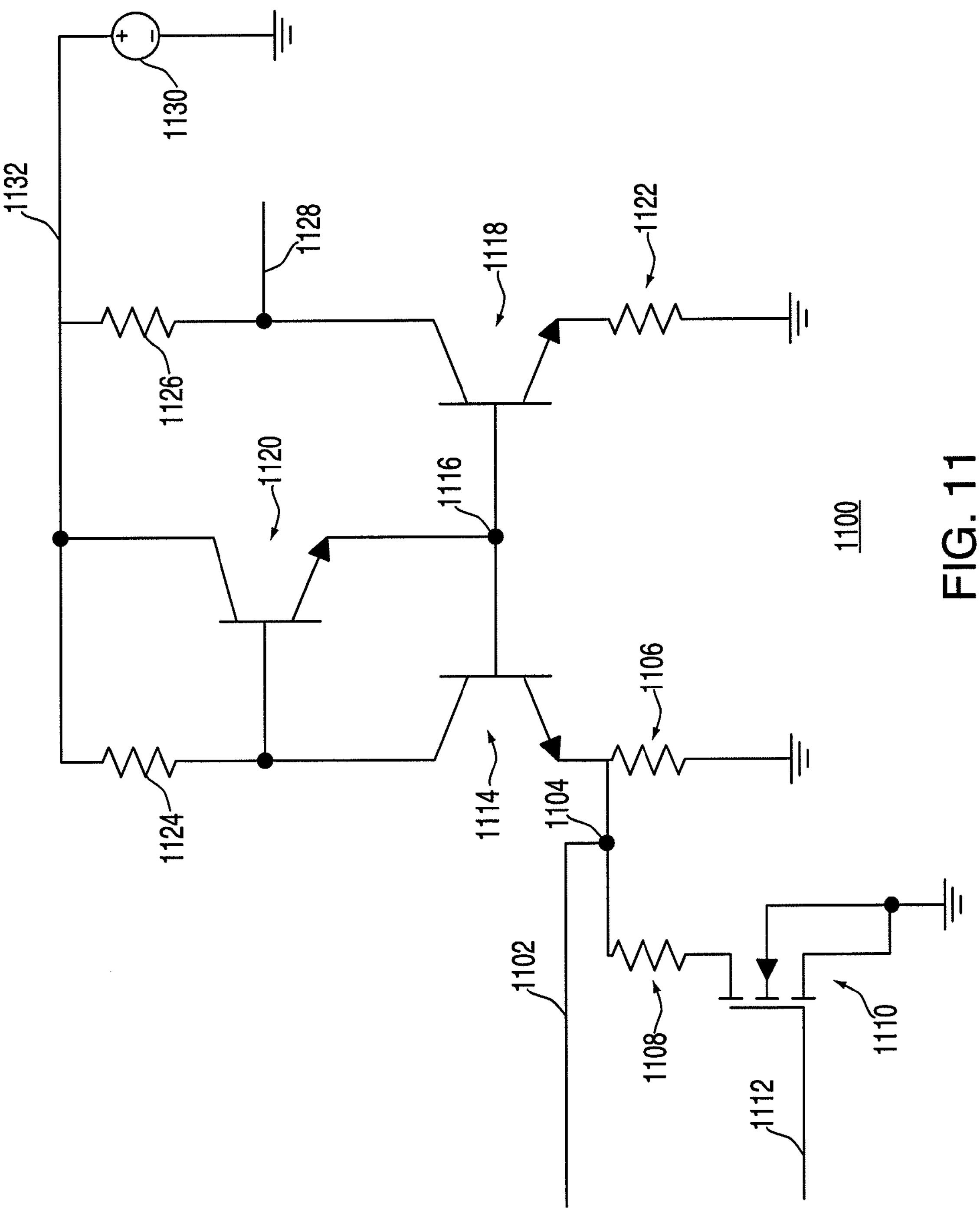
FIG. 11 is an illustrative schematic diagram of one embodiment of the invention.

FIG. 11 is a schematic diagram of system 1100, which includes exemplary electrical circuitry incorporating elements of the present invention. System 1100 can, among other things, detect headset transducers connected to portable multi-function devices. FIG. 11 includes wire 1102, which may carry an audio signal between a CODEC and a transducer in a connected headset (discussed earlier with respect to, e.g., FIGS. 8, 9, and 10). The electrical equivalent of a transducer is represented in FIG. 11 by resistor 1108, transistor 1110, and wire 1112. As shown in FIG. 11, an alternating control signal on wire 1112 can simulate the connection and disconnection of a headset. One skilled in the art will appreciate that a headset transducer could be shown in place of resistor 1108, and that toggling transistor 1110 in FIG. 11 could simulate the removal and insertion of a headset transducer.

FIG. 11 also contains junction 1104, which joins wire 1102, resistor 1106, resistor 1108, and the emitter of transistor 1114. In some embodiments of the present invention, resistor 1106 can be of greater electrical resistance than resistor 1108. The introduction of a headset transducer to system 1100 can cause the total electrical resistance at junction 1114 to decrease.

Transistor 1114 and transistor 1120, as shown in FIG. 11, represent and can function as a constant source of electrical current at the emitter of transistor 1114. This is accomplished by connecting both transistors to voltage source 1130. Thus, when a headset is introduced to system 1100, voltage drops at junction 1104 because electrical current remains constant and resistance drops.

Because the emitter voltage of transistor 1114 can decrease when a headset is inserted, the voltage at its base can also decrease. In turn, the base of transistor 1118, which is connected to the base of transistor 1114 via junction 1116, can also decrease. Voltage can then increase at the collector of transistor 1118. This voltage increase can be seen on wire 1128 as a "detect" signal, indicating the presence of a transducer in a connected headset. Similarly, removal of a connected headset can cause a corresponding drop in voltage on output wire 1128.

Figure 12:
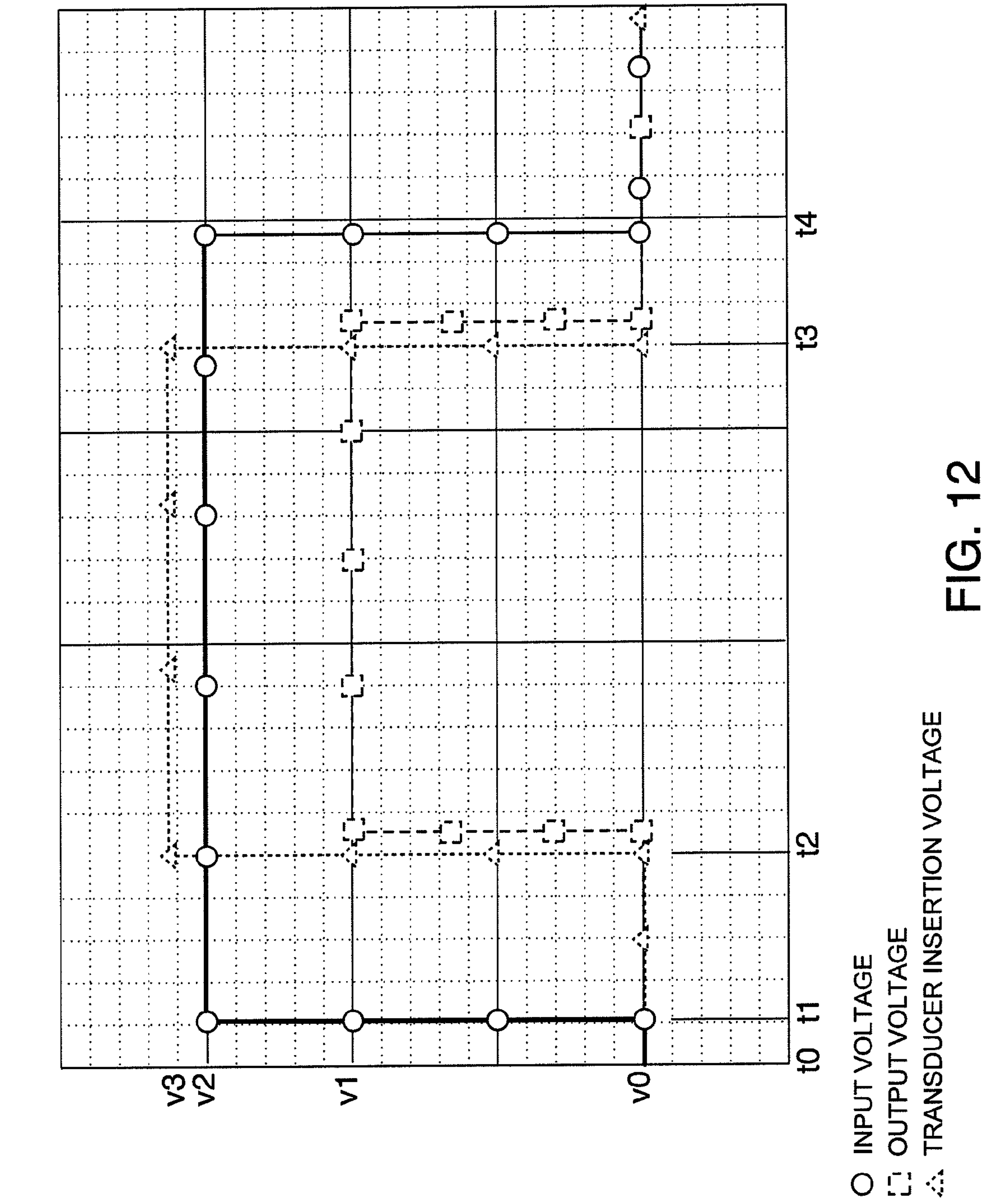
FIG. 12 is an electrical timing diagram of one embodiment of the invention.

FIG. 12 is an electrical timing diagram showing the states of INPUT VOLTAGE, OUTPUT VOLTAGE, and TRANSDUCER INSERTION VOLTAGE in accordance with the embodiments of the present invention discussed in connection with FIG. 11. In FIG. 12, INPUT VOLTAGE corresponds to the voltage carried on wire 1132 of FIG. 11, OUTPUT VOLTAGE corresponds to the voltage on wire 1128 of FIG. 11, and TRANSDUCER INSERTION VOLTAGE corresponds to the insertion or removal of a headset transducer, as represented by transistor 1110 in FIG. 11 switching between open and closed states.

Starting at time t0, INPUT VOLTAGE is set to the low value of v0. This may be because, among other things, the portable multi-function device is not in use. Because the circuit is not powered, OUTPUT VOLTAGE is also at the low power level of v0. At time t1, INPUT VOLTAGE is increased to v2. This may be because, among other things, the portable multi-function device is activated. As depicted in FIG. 12, INPUT VOLTAGE provides constant power to the circuit until time t4.

At time t2, a headset transducer is connected to the media player. As a result, TRANSDUCER INSERTION VOLTAGE can increase to v1. With respect to FIG. 11, this voltage represents a toggle of transistor 1110, thus introducing resistor 1108 to the circuit. Because there is a constant current source fed by the emitter of transistor 1114, the voltage at junction 1104 can drop, as can the voltage at junction 1116. As a result, OUTPUT VOLTAGE can rise to v3, as discussed earlier with respect to FIG. 11.

At time t3, a headset transducer is removed from the media player. As a result, TRANSDUCER INSERTION VOLTAGE can decrease to v0. With respect to FIG. 11, this voltage drop toggles transistor 1110, thus removing resistor 1108 from the circuit. In response, because the emitter of transistor of 1114 may no longer feed a constant current source, OUTPUT VOLTAGE drops back to v0, as discussed earlier with respect to FIG. 11.

Figure 13:
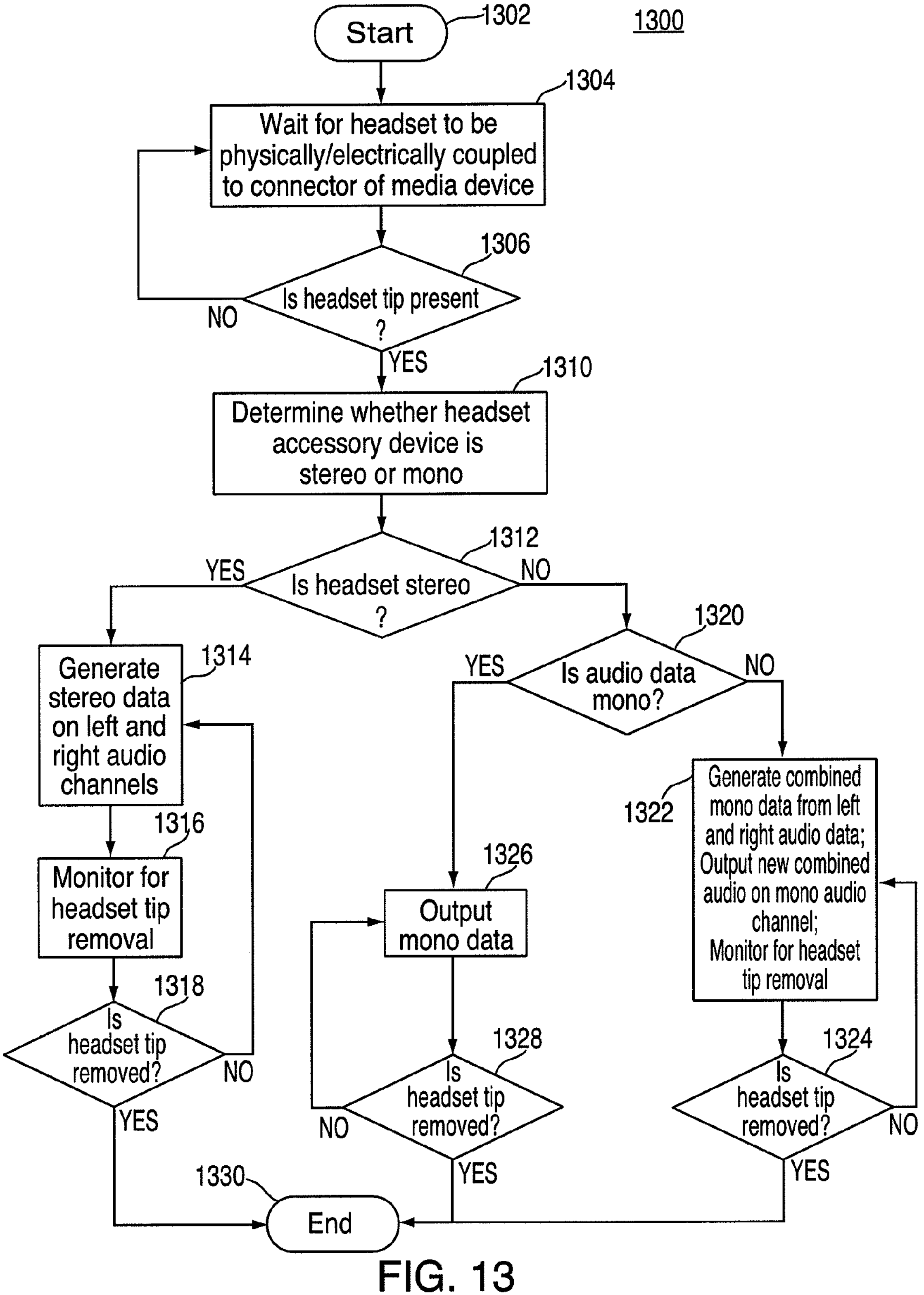
FIG. 13 is an illustrative flowchart of a process in accordance with an embodiment of the present invention.

FIG. 13 shows process 1300, which is an exemplary flow diagram depicting how a portable multi-function device may combine stereo audio signals into a single mono audio signal in response to detecting a mono headset accessory device being coupled to the portable multi-function device. Process 1300 starts at step 1302, and proceeds to step 1304, where the portable multi-function device is active may be waiting to receive a headset tip detect signal. For example, the portable multi-function device could be an Apple iPhone™ without a headset or anything else coupled to the iPhone's headset connector. After step 1304, process 1300 proceeds to step 1306, where a determination is made as to whether a headset tip is coupled to the connector of the portable multi-function device. If no headset tip is coupled to the connector of the portable multi-function device, process 1300 returns to step 1304. However, if a headset tip is coupled to the connector of the portable multi-function device, the process advances to step 1310, where a determination is made as to whether the coupled headset accessory device is stereo or mono.

Next, process 1300 advances to the conditional step 1312. In response to the presence of a stereo headset accessory device, process 1300 advances from step 1312 to state 1314, where stereo audio data is generated by the portable multi-function device. Process 1300 then advances to step 1316 when the stereo headset accessory device is removed from the connector of the portable multi-function device. After step 1316, process 1300 ends at step 1330.

In response to a mono headset accessory device, process 1300 advances from step 1312 to step 1320, where a determination is made as to whether mono or stereo audio data is being generated by the portable multi-function device. In response to the generation of mono audio data, process 1300 advances to step 1322, where the mono audio data is sent to the mono headset speaker. If the audio data is stereo, the process advances from step 1320 to step 1326, where the portable multi-function device combines stereo audio channels into a new combined mono data signal containing audio data from the multiple stereo channels. The combination of channels may be achieved by hardware or software running on the device. The new combined mono audio data is directed toward whichever audio channel is coupled to a headset speaker in the headset accessory device coupled to the portable media player. The process advances to step 1324 when the headset accessory device is removed from the connector of the portable media player, or when the portable media player is no longer active (for example, due to a user turning the device off, or due to an automatic shut-down). After step 1316, process 1300 ends at step 1330.

Figure 14:
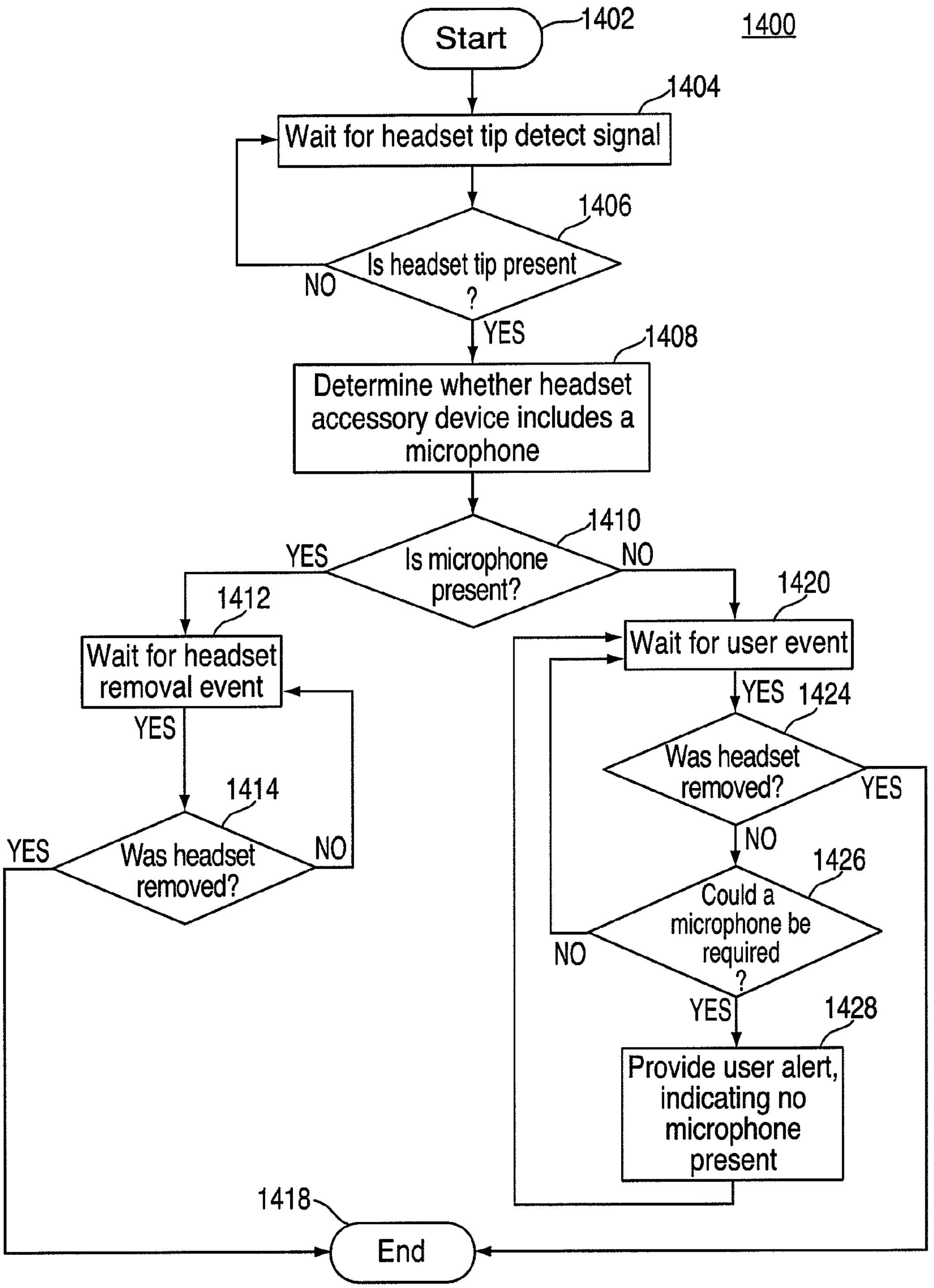
FIG. 14 is an illustrative flowchart of a process in accordance with an embodiment of the present invention.

FIG. 14 shows process 1400, which is an exemplary flow diagram depicting how a portable multi-function device may alert a user to the absence of a headset microphone, in cases where such a microphone may be needed. Process 1400 starts at step 1402, and proceeds to state 1404, where the portable multi-function device is active and waiting to receive a headset tip detect signal. For example, the device could be an Apple iPhone™ without any headset accessory device coupled to the headset jack. After step 1404, process 1400 proceeds to step 1406, where a determination is made as to whether a headset tip is coupled to the connector of the portable multi-function device. If not, process 1400 returns to step 1404. However, if a headset tip is coupled to the connector of the portable multi-function device, the process advances to step 1408, where a determination is made as to whether the coupled headset accessory device includes a functioning microphone. Next, process 1400 advances to the conditional step 1410.

In the presence of a microphone, process 1400 advances from step 1410 to step 1412, where the process waits for a headset to be decoupled. Next, process 1400 advances to the conditional step 1414. In response to a coupled headset, process 1400 returns to step 1412. However, in response to the decoupling of a headset, process 1400 advances to step 1418.

In the absence of a microphone, process 1400 advances from step 1410 to step 1420, where the process waits for a user input event. A user input event could include, for example, any data, signal or signals resulting in whole in part from a user's interactions with a portable multi-function device. For example, a user input event as referred to herein could include a telephone call, a command to play an audio or video file, a command to record, monitor, or process sound, or even the decoupling of a headset or other accessory device.

When a user input event takes place, process 1400 first determines at step 1424 whether the headset accessory device has been decoupled. In response to the decoupling of a headset accessory device, the process advances to end step 1418. Otherwise, the process advances to step 1426, at which a determination is made as to whether the device is being used in a manner that may require a microphone—For example, the initiation of a telephone call, or a command to record, monitor, or process sound. In response to the portable multi-function device being used in a manner that will not require a microphone, process 1400 returns to step 1420. However, in response to the portable multi-function device being used in a manner that may require a microphone, process 1400 advances to step 1428, where the portable multi-function device generates an alert. The purpose of this alert is to inform users that the device may require a microphone and that no microphone is present. The alert may be visual, audible, kinetic (i.e., vibrations) or any combination thereof. Following the alert at step 1428, process 1400 returns to step 1420.

It is understood that the various features, elements, or processes of the foregoing figures and description are interchangeable or combinable to realize or practice the invention described herein. Those skilled in the art will appreciate that the invention can be practiced by other than the described embodiments, which are presented for purposes of illustration rather than of limitation, and the invention is limited only by the claims which follow.

What is claimed is:

1. An apparatus comprising:

a portable multi-function device having sensor circuitry for producing sensor signals that are indicative of how many transducer devices are coupled to the portable multi-function device and processor circuitry for generating an output mode for the portable multi-function device from a plurality of output modes based, at least in part, on the sensor signals, wherein at least one of the sensor signals is indicative of at least one characteristic of a transducer device coupled to the portable multi-function device, wherein the at least one characteristic comprises a detect signal indicating the presence of a transducer in a connected headset, wherein the at least one characteristic further comprises at least one microphone characteristic indicating that a microphone is absent or damaged, wherein at least one of the plurality of output modes comprises employing circuitry for generating user feedback comprising an alert (i) that the device may require a microphone and (ii) that no microphone is present.

2. The apparatus of claim 1, wherein the sensor circuitry comprises:

circuitry for determining how many transducer devices are coupled to the portable multi-function device; and circuitry for responding to the determination.

3. The apparatus of claim 1, wherein the processor circuitry comprises:

circuitry for measuring the sensor signals, and for responding, at least in part, to the sensor signals.

4. The apparatus of claim 1, wherein the at least one characteristic comprises at least one speaker characteristic on a left or right audio channel of the headset.

5. The apparatus of claim 4, wherein the at least one speaker characteristic comprises a left channel detect signal of a functional speaker coupled to a left audio channel of a headset tip of the headset, and a right channel detect signal of a functional speaker coupled to a right audio channel of the headset tip.

6. The apparatus of claim 1, wherein at least one of the plurality of output modes comprises employing circuitry for generating mono audio that is based upon stereo audio.

7. The apparatus of claim 6, wherein the mono audio comprises audio information contained in one channel, and wherein the stereo audio comprises audio information contained in more than one channel.

8. The apparatus of claim 1, wherein the user feedback comprises communications that are based, at least in part, on the sensor signals, and wherein the communications comprise at least one of the following:

(i) vibratory output;

(ii) audio output; and (iii) visual output.

9. The apparatus of claim 1, wherein the portable multi-function device is capable of telephony capability.

10. The apparatus of claim 1, wherein the microphone characteristic comprises not receiving the sensor signal, wherein in response to not receiving the sensor signal, the processor circuitry determines that the microphone is absent or damaged, determines whether the portable multi-function device is being used in a manner that requires a microphone, and does not send the alert when the device is not being used in a manner that requires a microphone, but does send the alert in response to determining that the device is being used in a manner that does require a microphone.

11. A method comprising:

adapting the output of a portable multi-function device by producing sensor signals indicative of how many transducer devices are coupled to the portable multi-function device and generating an output mode for the portable multi-function device from a plurality of output modes, based, at least in part, on the sensor signals, wherein at least one of the sensor signals is indicative of at least one characteristic of a transducer device coupled to the portable multi-function device, wherein the at least one characteristic comprises a detect signal indicating the presence of a transducer in a connected headset, wherein the at least one characteristic further comprises at least one microphone characteristic indicating that a microphone is absent or damaged, wherein at least one of the plurality of output modes comprises employing circuitry for generating user feedback comprising an alert (i) that the device may require a microphone and (ii) that no microphone is present.

12. The method of claim 11, wherein the generating comprises:

measuring the sensor signals; and responding, at least in part, to the sensor signals.

13. The method of claim 11, wherein the producing comprises:

determining how many transducer devices are coupled to the portable multi-function device; and responding to the determination.

14. The method of claim 13, wherein the responding comprises:

indicating at least one characteristic of a transducer device coupled to the portable multi-function device.

15. The method of claim 14, wherein the at least one characteristic comprises at least one speaker characteristic on a left or right audio channel of the headset.

16. The method of claim 15, wherein the at least one speaker characteristic comprises a left channel detect signal of a functional speaker coupled to a left audio channel of a headset tip of the headset, and a right channel detect signal of a functional speaker coupled to a right audio channel of the headset tip.

17. The method of claim 11, wherein at least one of the plurality of output modes comprises generating mono audio that is based upon stereo audio.

18. The method of claim 17, wherein the mono audio comprises one channel of audio information, and wherein the stereo audio comprises audio information contained in more than one channel.

19. The method of claim 11, wherein the user feedback comprises communications that are based, at least in part, on the sensor signals, and wherein the communications comprise at least one of the following:

(i) vibratory output;

(ii) audio output; and (iii) visual output.

20. The method of claim 11, wherein the microphone characteristic comprises not receiving the sensor signal, wherein in response to not receiving the sensor signal, the processor circuitry determines that the microphone is absent or damaged, determines whether the portable multi-function device is being used in a manner that requires a microphone, and does not send the alert when the device is not being used in a manner that requires a microphone, but does send the alert in response to determining that the device is being used in a manner that does require a microphone.

* * * * *